June 11, 1957 H. E. HULL ET AL 2,795,397
ELECTRICAL TRANSMISSION LINES
Filed April 23, 1953 10 Sheets-Sheet 10

United States Patent Office 2,795,397
Patented June 11, 1957

2,795,397

ELECTRICAL TRANSMISSION LINES

Henry E. Hull and Paul G. Perry, Columbus, Ohio, assignors, by mesne assignments, to Drilling Research, Inc., Houston, Tex., a corporation of Delaware Application April 23, 1953, Serial No. 350,679

27 Claims. (Cl. 255—28)

This invention relates to electrical transmission lines. It has to do, more particularly, with conducting lines and connectors so constructed as to occupy a minimum amount of space so as to be particularly useful for the transmission of electricity through a central passage in equipment, such as oil-well drill string, in which space is at a premium and in which power requirements may be of the order of several hundred kilowatts. The electrical transmission lines of this invention are particularly suitable for use in earth-drilling equipment in which it is desired to supply electrical power through a relatively long drill string to a drilling motor or other power-consuming device and to transmit signals from down-hole instruments.

For economic reasons, deep wells, which may extend several miles underground, are necessarily of small diameter, the size of the casing ranging from about five inches to about 15 inches, the more usual size being from six to ten inches. The severe limitations of hole size require a motor type particularly suited to the application, if adequate forces and power are to be produced. Magnetostrictive motors of a specialized type, such as are shown in the copending application for U. S. Letters Patent of Boyd A. Wise et al., Serial No. 350,314, meet the necessary limitations and requirements, and are especially well suited to the drilling of wells.

The severity of the limitations imposed by the small size of the bore hole is intensified as the drilling rate increases. As the bit penetrates more rapidly, the chips or fragments of the strata must be removed at higher rates, and it is necessary to increase the circulation of "mud," a term generally used to refer to the medium that carries away the drilling chips. The drill string and the drilling column must, of course, provide a flow passage for the circulation of mud at reasonable pumping pressures and in sufficient volume to remove the chips as fast as they are produced, and thus maintain the drill in contact with the strata to be penetrated and unimpeded in its progress by any substantial depth of chips or fragments.

In the drilling of deep wells, it is customary to circulate mud downward through an inner passage in the drill string, through an opening in the drill bit, and upward in the annular space around the drill string to carry the chips and fragments to the surface. The inner passage in the drill string should, of course, be as large as possible, and preferably should be circular in cross section, in order to provide minimum resistance to the flow of the mud and to provide a cylindrical unobstructed passage that will accommodate the tools used in customary surveying and fishing operations. Hence, it is desirable to use only the minimum required space for the transmission of electricity through the drill string.

In preferred forms of the invention, the conductors of the line and of the connectors are all of annular or substantially semi-annular shape. The conductors of the line are rigidly secured against the sections of drill pipe, forming an inner liner and leaving the desired cylindrical unobstructed passage. Despite the fact that the diameter of the cylindrical passage in the drill string is not appreciably reduced by the presence of the transmission line, the line provides sufficient current-carrying capacity to meet the power requirements of a magnetostrictive motor of the type required for rapid drilling of deep wells. In preferred forms of the invention, the transmisison line is constructed in sections, each section having a length approximating that of each section or joint of drill pipe or of drill collar in the drill string. Electrical connectors are provided at the ends of each section to connect successive sections of the transmission line. Also included are means providing protection of the transmission line against mechanical damage and against abrasion from mud flowing through the drill string, and sealing means to prevent the entry of moisture, mud, or other foreign matter into the line or the connectors.

It is a primary object of this invention, therefore, to provide electrical transmission lines having the foregoing features and advantages. Further objects and advantages will be apparent, however, from the following detailed description and claims.

Figures 1, 2:
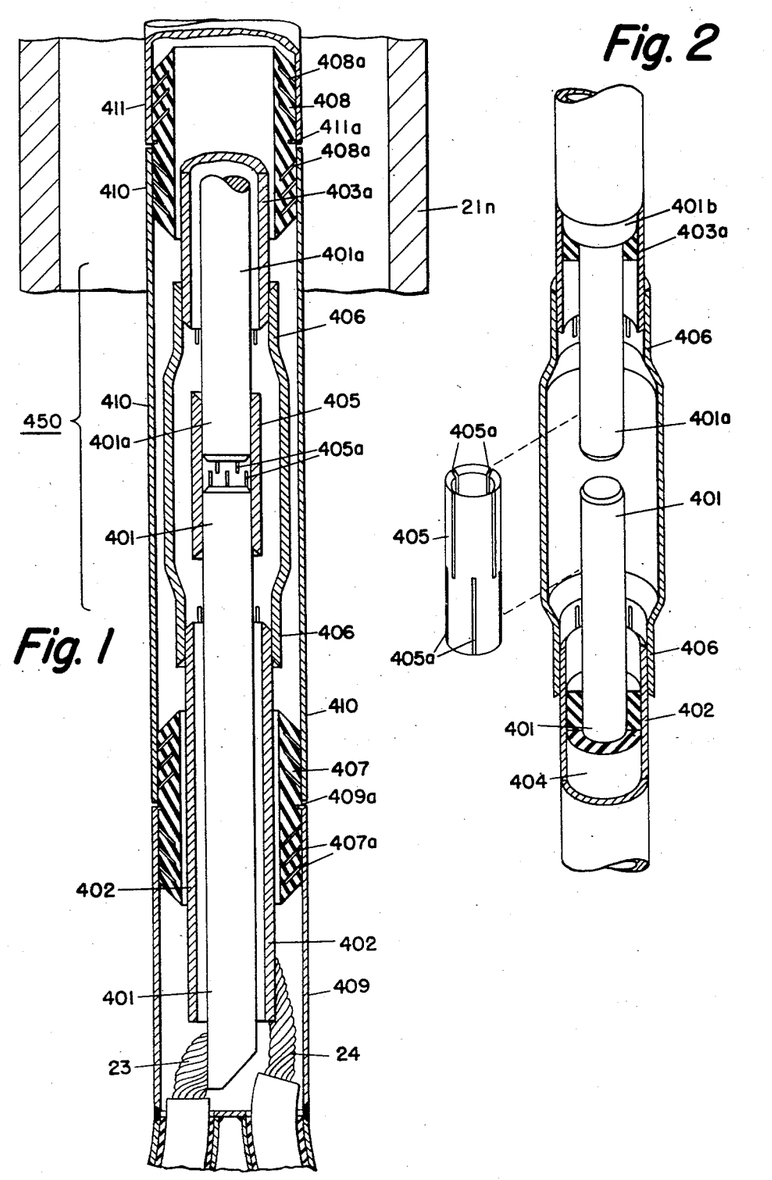
Fig. 1 is a sectional view of a transmission line according to the present invention.
Fig. 2 is a perspective view, partly in section and with parts omitted, of the transmission line of Fig.1.

As shown in Fig. 1, conductors 23 and 24 from a transducer (not shown) are brazed or soldered to inner and outer cylindrical conductors 401 and 402. The inner conductor 401, preferably cylindrical, may be either solid or tubular. The outer tubular conductor 402, need not be, but preferably is, cylindrical. Insulation which is, and must be, present between the conductors and between the conductors and the sheaths 409 and 411, and preferably between the conductors 23, 24, 401, 402, 401a, and 403a and the removable chevron seals 407 and 408, has been omitted in Fig. 1 in the interest of clarity. The insulation may be thin cylinders, such as the insulating cylinder 404 shown in Fig. 2 between conductors 401 and 402.

In the vicinity where adjacent drill-pipe sections are fastened together, provisions are made for the separation of one section of transmission line from another. To this end, a conductor-coupling member 405, illustrated separately in Fig. 2, interconnects the lower inner conductor 401 with the corresponding upper inner conductor 401a extending upwardly of the drill string. The conductor-coupling member 405 is preferably made of elastic material such as beryllium-copper alloy. The inner diameter is made slightly less than the outer diameter of conductors 401 and 401a. By providing slots 405a, spring fingers are formed which, upon assembly of the transmission line, insures a low-resistance joint by their wiping action. Similarly, an outer conductor-connecting member 406 of elastic material, such as beryllium copper, may be provided with similar spring fingers at opposite ends for wiping action with the lower outer conductor 402 and the upper outer conductor 403a.

Conductors 401a and 403a extend with their insulations from bridging assembly 450 to the next bridging assembly, preferably located in the vicinity of the next drill-pipe connection.

As thus far described, it will be seen that a current path is provided for conductor 23 which extends upwardly by way of inner conductor 401, coupling member 405, and conductor 401a. Another current path is provided from conductor 24 by way of outer conductor 402, the outer connecting member 406, and upwardly by way of outer conductor 403a.

All of the open annular space appearing in Fig. 1 within sheath 410 is filled with suitable insulating material and the severable joints between sheaths 409 and 410 and between sheaths 410 and 411 are made watertight by the provision of the readily replaceable sealing members 407 and 408, which may be operationally retained in sheaths 409 and 411 by circular inturned lips 409a and 411a. These sealing members are preferably of the chevron type; that is to say, they are respectively provided with a series of flexible annular sealing members formed with a series of circumferential slots 407a and 408a. Thus, hydraulic pressure, from the mud or other liquid in the drill hole, is applied by way of each joint between sheaths to at least two of the slots 407a to expand the packing and to press the sealing members against their adjacent sheaths. The pressure increases the tightness of the seal, both as between the inner surfaces of the outer sheaths 409 and 410 and the seal against the insulated conductor 402. The chevron seal 408 functions in like manner.

Figure 3:
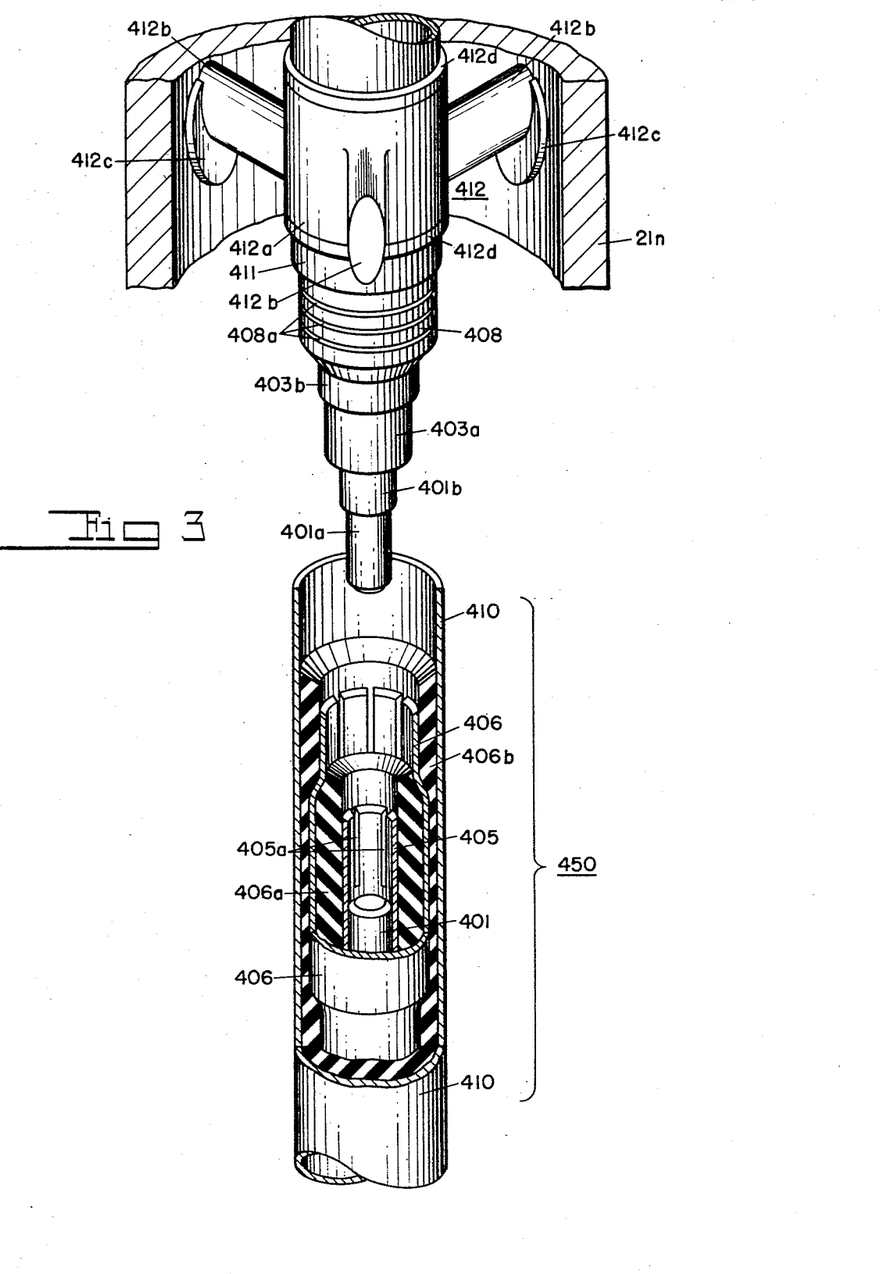
Fig. 3 is a perspective view, partly in section, with insulation added to a part of the line of Figs. 1 and 2.

The manner in which the parts cooperate can be readily understood by referring to Fig. 3, in which the conductor 406 is shown encircling electrical insulation 406a interposed between the outer conductor 406 and the inner conductor 405, insulation 406b being interposed between conductor 406 and the sheath 410. Suitable insulating material filling the open annular spaces within sheath 410 will be a resilient material and by configuration and surface bonding to the metallic elements 410, 406, and 405, will cause the bridging assembly to act as a unit.

When it is desired to uncouple adjacent sections of the transmission line, with their respective sections of drill pipe 21n, shown fractionally in Fig. 1, the threaded connection of the drill string is unscrewed. The upper sheath 411 and conductors 403a and 401a will be moved upwardly with the upper chevron seal 408. The upward force exerted on sheath 410 by the chevron seal 408, on the conductor 406 by conductor 403a, and on conductor 405 by conductor 401a may cause the bridging assembly to move upwardly with the upper section of drill pipe until the transmission line is separated. If the frictional forces between the bridging assembly and the upper extremity of the lower section of transmission line are greater than those between the bridging assembly and the lower extremity of the upper section of transmission line, the separation of the transmission line will also be accomplished but the bridging assembly will remain with the lower section of transmission line.

In assembling the line, the bridging assembly again acts as a unitary assembly. Accordingly, the assembly 450 may be moved onto a terminal end of a section of the transmission line. As the upper slotted end of conductor 406 engages cylindrical conductor 402 or 403a, the slotted end of conductor 405 engages conductor 401 or 401a. While the assembly is normally placed upon the lower conductors, such as conductors 401 and 402, of Fig. 3, the connector assembly may be first placed on either end of a section of transmission line with the other section then movable into circuit-completing position by screwing the drill pipe sections together to complete the assembly, with a substantial annular flow passage between the transmission line and the drill pipe.

Referring to Fig. 3, as the lower extremity of the upper section of transmission line is moved into circuit-completing position, insulation elements 401b and 403b slide within insulation elements 406a and 406b, respectively. This cylindrical telescoping may be used to provide adequate electrical leakage paths consistent with operating potential of the transmission line.

Referring to Fig. 1, provision for manufacturing tolerances and wear of the threaded connection of the drill string has been provided by allowance of axial clearance between corresponding members formed on the same diameters of the upper extremity of the lower transmission line, the bridging assembly 450, and the lower extremity of the upper transmission line.

To support the transmission line in sections, and to maintain it substantially centrally disposed within the drill pipe, fins may be provided, normally two sets to a section of drill pipe. One arrangement 412 is shown in Fig. 3. A ring support 412a has extending radially therefrom at least three arms or fins 412b, two of which appear in Fig. 3. Each set of fins may be rigidly fastened to the sheath 411; or the ring 412a may have an inner diameter such as to provide a small clearance around the sheath 411, and the ring 412a may be located between rings 412d rigidly secured to the sheath 411 above and below so as to prevent longitudinal movement between the fin assembly 412 and the transmission line but to permit movement of the fin assembly 412 in a rotational direction with respect to the transmission line. One set of fins in each section of transmission line, preferably the lower set, may support the section of transmission line either by means of permanent connections to the drill pipe, or preferably by means of supporting brackets 412c secured to the inner wall of the drill pipe, and including vertical slots to receive and support the fins 412b as shown in Fig. 3. The transmission line can be withdrawn from the drill string without disconnecting the sections of the drill string itself where the supporting brackets 412c are used throughout, since any portion of the line comprising at least one section can be removed upwardly by a cable and grappling hooks. The entire transmission line can be removed quickly, section by section, from a drill string in a deep well while leaving the drill string intact in the wall.

It is apparent that the conductors of the transmission line are contained within a fluid-tight housing consisting of the abutting sheaths 409, 410, and 411, and that the sealing members 407 and 408 are of the fluid-expansible type. Although the pressure may change from atmospheric to the very high pressures encountered at the bottom of the drill hole, the expansible sealing means, nevertheless, maintain the tight seals necessary to prevent ingress of moisture. Notwithstanding the relative pressures exerted by the sealing members against the insulation surrounding the outer conductors 402 and 403a of the line, the several sections of the line are readily disconnected one from the other. Each of the sealing members 407 and 408 is interlocked with its respective sheath 409, 411 as by the inturned annular lips 409a, 411a, to retain the sealing members in place upon the removal of the bridging assembly 450 as a unit.

Figure 4:
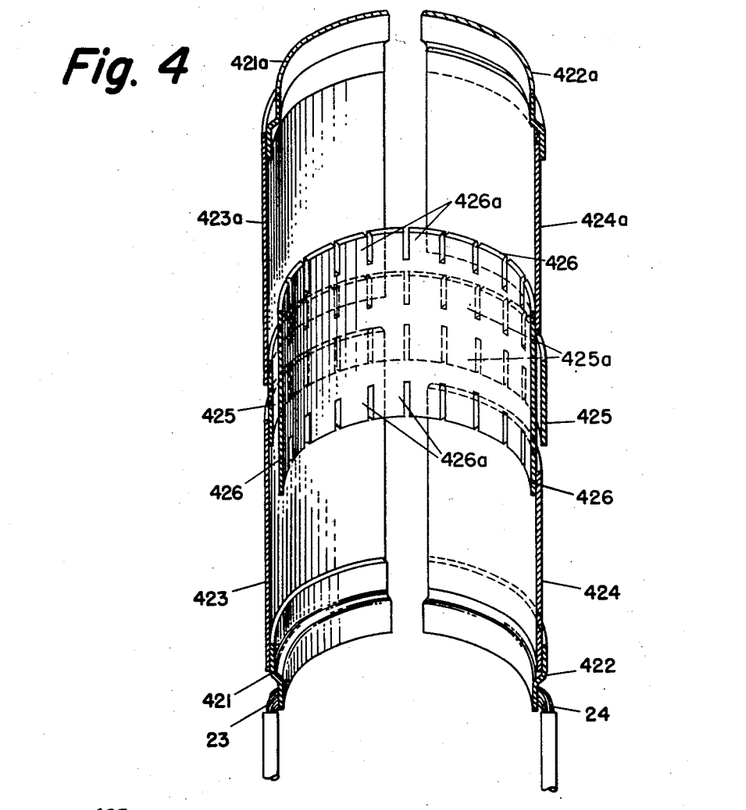
Fig. 4 is a perspective view, partly in section, of another type of transmission line according to the present invention, the insulation having been omitted for purposes of clarity.
Figure 5:
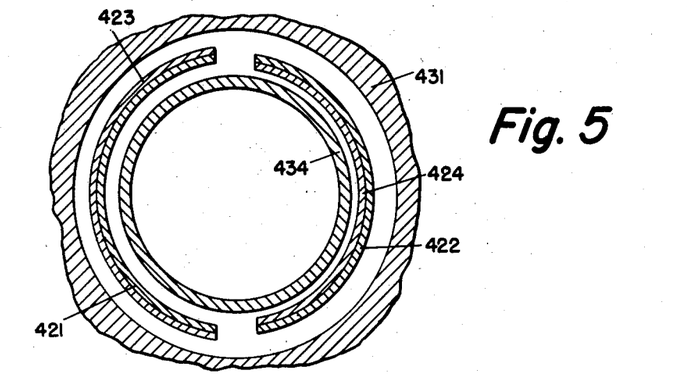
Fig. 5 is a sectional view, taken on line 5—5 of Fig. 6, showing the radial displacement of two of the conductors of the bridging assembly of Figs. 4, 6–11.

An understanding of another type of transmission line will be facilitated by referring to the perspective view of Fig. 4, in which insulation is omitted for purposes of clarity. Conductors 23 and 24 are shown connected, as by brazing or soldering, to substantially semi-annular conductors 421 and 422 disposed at equal radii. The latter are in turn connected, as by brazing or soldering, to substantially semi-annular terminal conductors 423 and 424, the conductor 423 extending upwardly beyond the upper end of the conductor 424. Conductors 423 and 424 are disposed at different radial distances from the center line of the transmission line assembly. In accordance with the invention, corresponding downwardly extending conductors 421a—423a and 422a—424a are respectively connected to conductors 421—423 and 422—424 by way of annular bridging conductors 425 and 426. Opposite ends of the annular bridging conductor 426 preferably have spring fingers 426a which engage semi-annular conductors 424 and 424a. To form these spring fingers, the opposite ends of member 426 may be slotted in the manner previously described to assure a good wiping contact. Similarly, the opposite ends of annular bridging conductor 425, which are preferably slotted to provide spring fingers 425a, engage the adjacent ends of conductors 423 and 423a. By reason of the selected differing diameters and differing lengths, the annular bridging conductors 425 and 426, respectively, connect conductors 423 to 423a and 424 to 424a regardless of their relative angular positions about the longitudinal axis. Accordingly, it is unnecessary to have one section of transmission line in circumferential alignment with any other. As each section is brought into engagement with the next section, the annular bridging conductors 425 and 426 establish low-resistance electrical connections.

Figure 6:
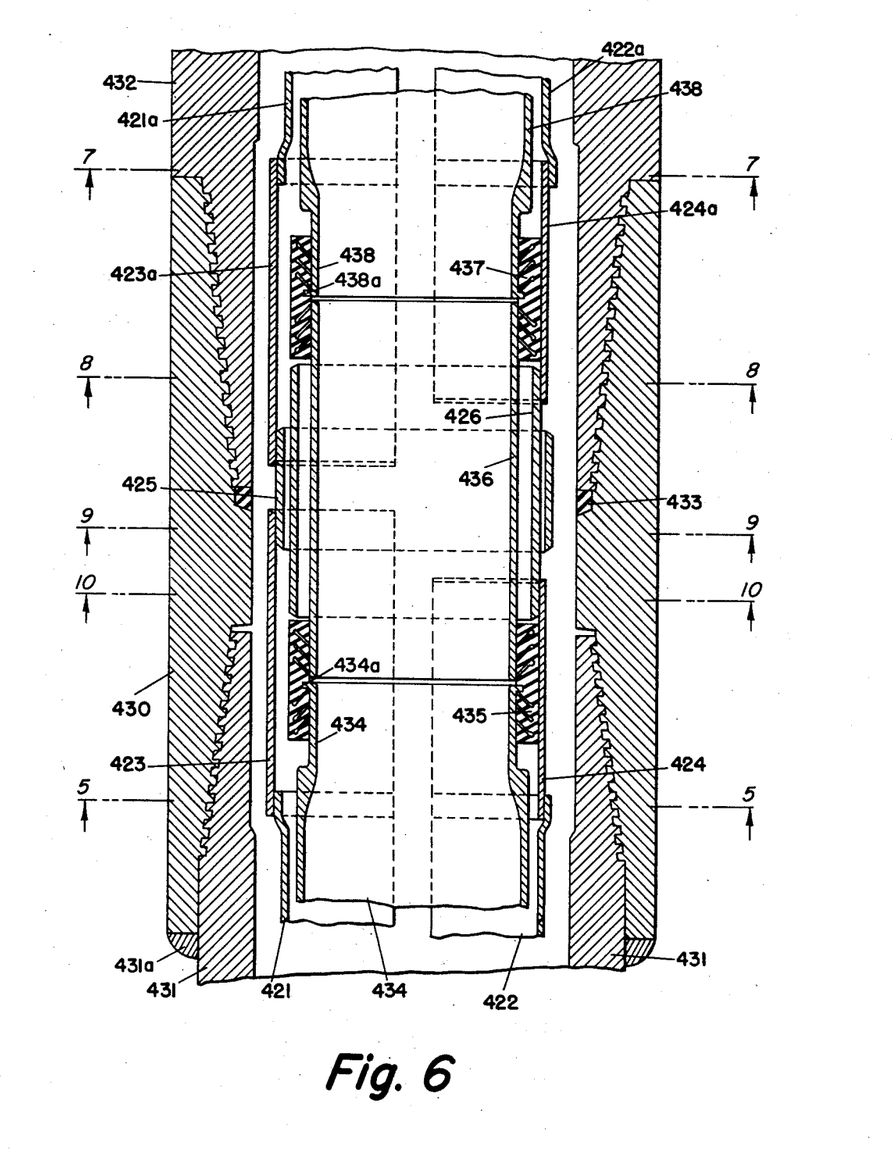
Fig. 6 is a section view of the transmission line of Fig. 4 shown at the juncture of two drill pipes.

As shown in the sectional view of Fig. 6, in which the insulation is again omitted for purposes of clarity, a connecting member 430 is secured in permanent connection, as by welding at 431a, to the upper end of a lower section of drill pipe 431 to form a box end which threadedly and removably receives the connecting member 432; a good grade of packing material 433 may be included to minimize air space in the electrical connector region. A tubular protecting member 434 extends upwardly from the lower section of drill pipe 431 and terminates in the region in which there is located a chevron-type of seal 435. An outturned lip 434a may be provided as shown at the end of the sheath 434 to form an interlocking connection retaining the seal 435 in the lower section of drill pipe. A short tubular protecting member 436 extends from the lower tubular protecting member 434 at seal 435 to an upper tubular protecting member 438 at a second chevron seal 437. The tubular protecting sheath 438 from the upper section of the drill pipe terminates at the location of the chevron seal 437 where an outturned lip 438d may be provided as shown to form an interlocking connection retaining the seal 437 in the upper section of drill pipe. The tubular protecting members 434, 436, and 438 are coaxial, or symmetrically disposed about the longitudinal axis of the drill pipe and provide an open and unobstructed passage for flow of mud through the drill string.

Figure 7:
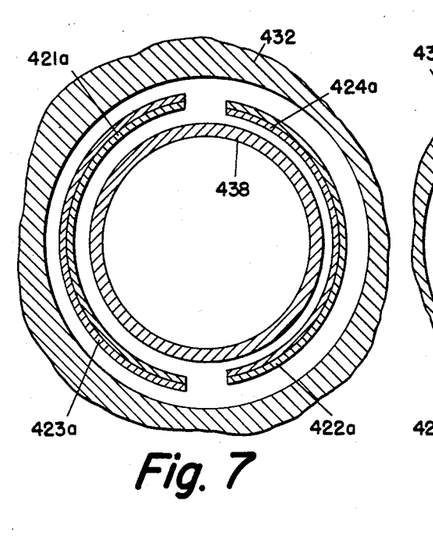
Figs. 7–10 are sectional views taken respectively on lines 7—7 to 10—10 of Fig. 6.
Figure 8:
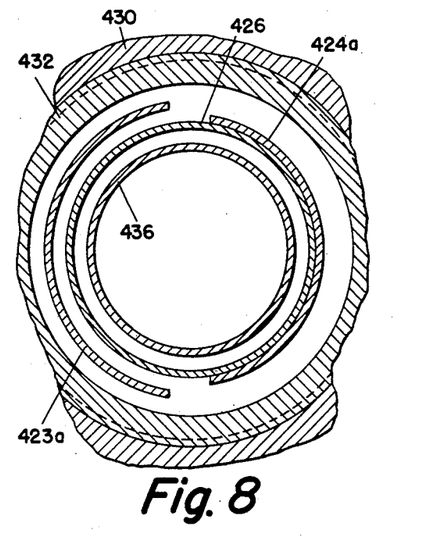
Figure 9:
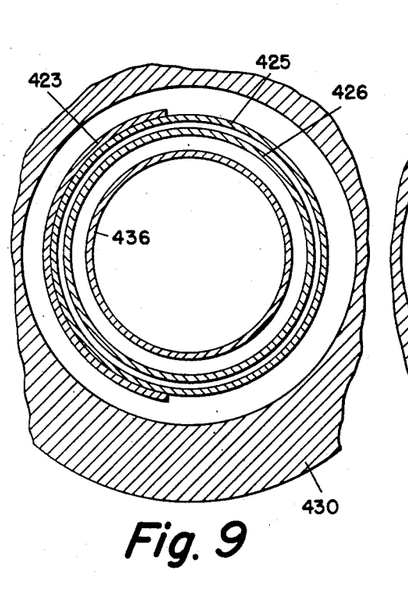
Figure 10:
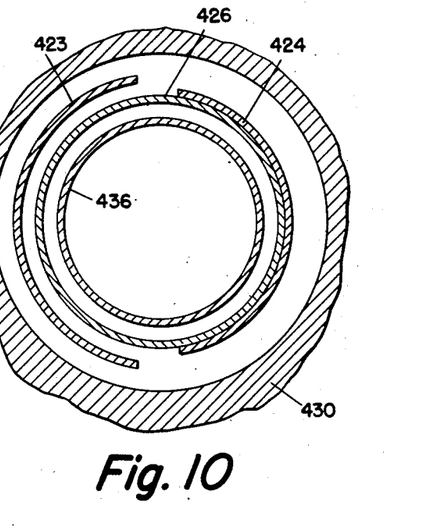
Figure 11:
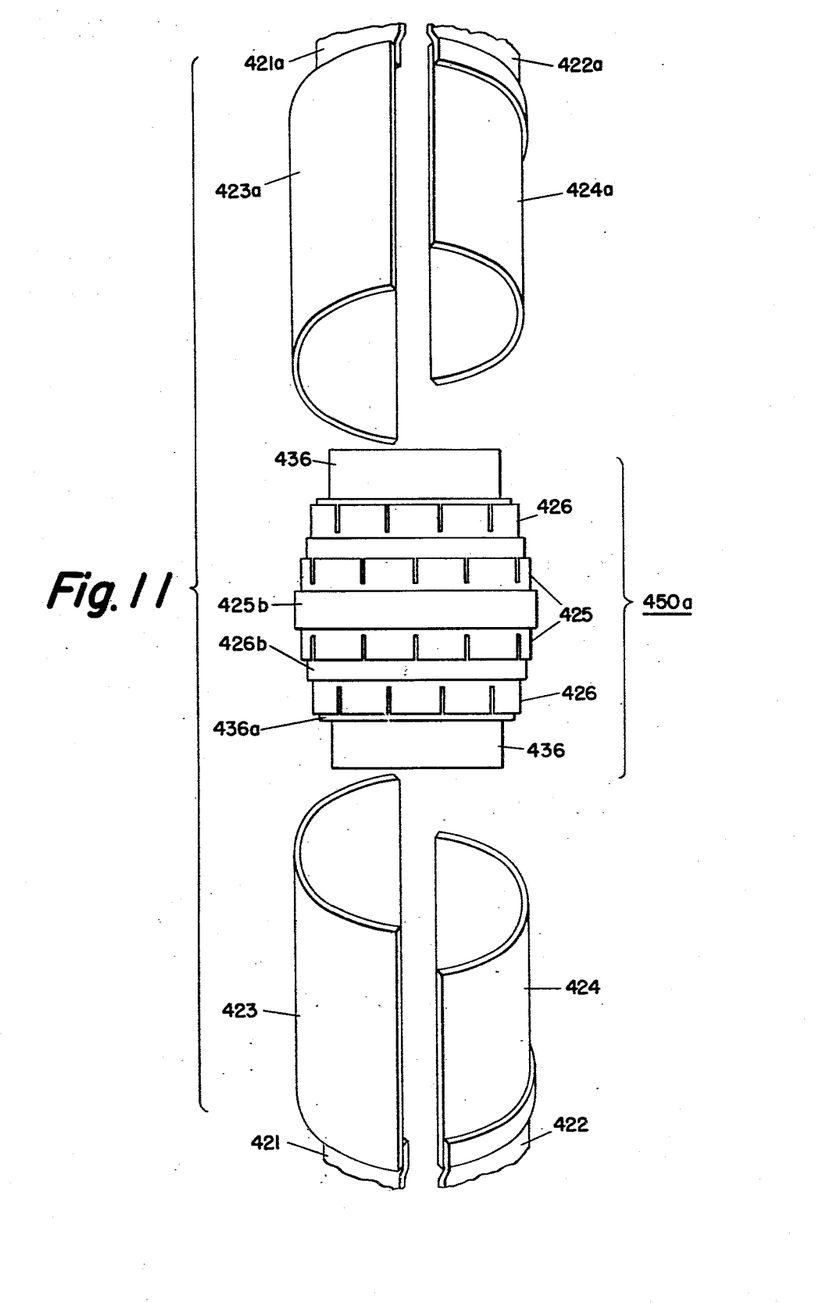
Fig. 11 is a perspective view of certain conductors in association with bridging conductor assembly of Figs. 5, 6, and 12.
Figure 12:
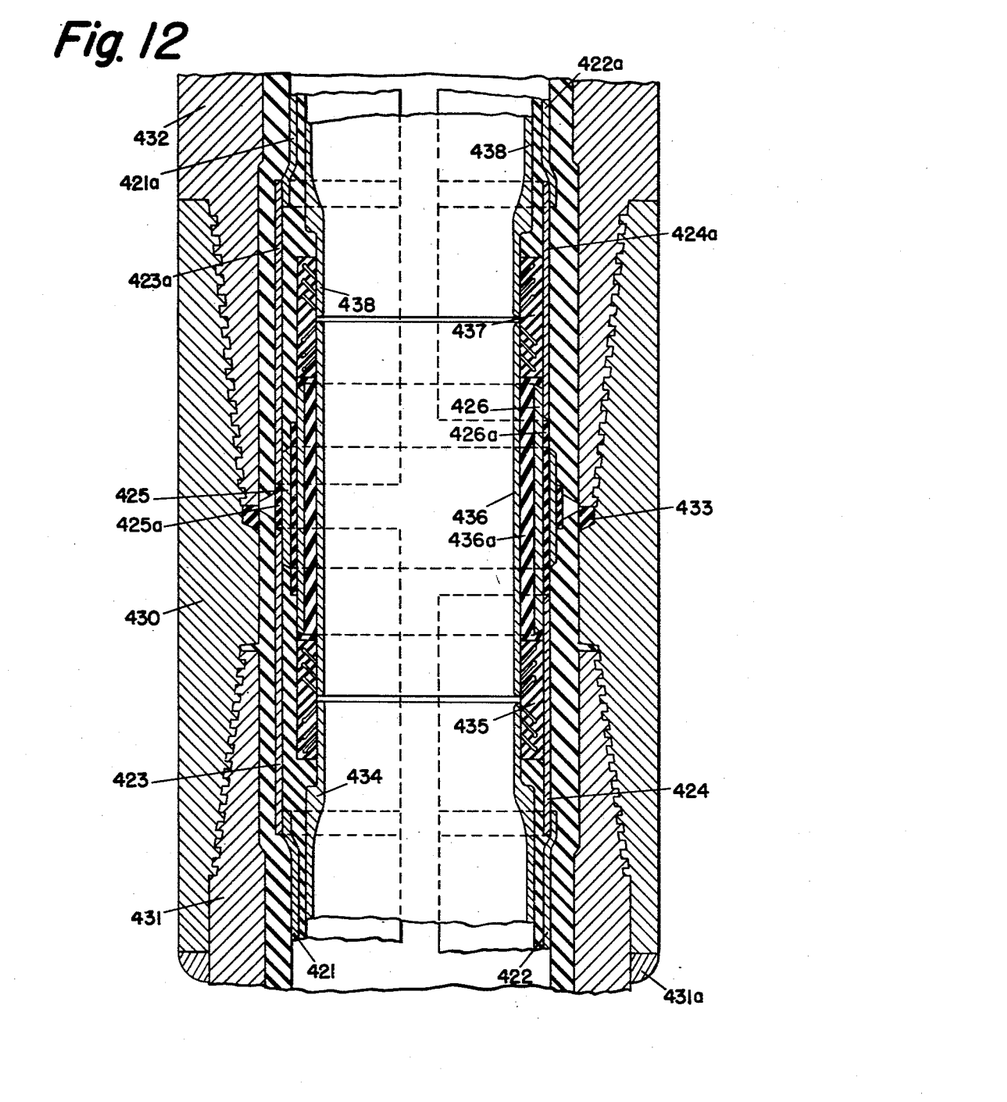
Fig. 12 is a sectional view of the transmission line of Fig. 6 with the insulation added.

In Fig. 7, the brazed or soldered electrical connection between the semi-annular conductors 421a and 423a is clearly shown, as is the similar brazed or soldered connection between conductors 422a and 424a. In the region immediately below the chevron seal 437, as shown in Fig. 8, it will be seen that the annular bridging conductor 426 is in electrical contact with the conductor 424a but is spaced inwardly a substantial distance from the conductor 423a. In the region adjacent to the end of annular bridging conductor 425, it will be seen from Fig. 9 that the bridging conductor 426 is spaced inwardly from the bridging conductor 425, while the latter is in good electrical engagement with conductor 423. Similarly, Fig. 10 illustrates the electrical connection between bridging conductor 426 and the conductor 424. Consideration of Figs. 8 and 10 will make clear the fact that the upper section may be in any circumferential angular position relative to the angular position of the lower section of drill pipe. Change in such relative angular positions would only have the effect of positioning conductor 424a about the circumference of annular bridging conductor 426. Thus, each of conductors 424a and 424 of Figs. 8 and 10 may occupy any position circumferentially on their associated annular bridging conductor 426. Similarly, any change of relative angular position merely changes the relative position of conductor 423 circumferentially on conductor 425. Referring to Figs. 11 and 12, it is to be understood that the bridging conductors 425 and 426, the tubular protecting member 436 and their associated insulating members 425b, 426b, and 436a are preferably bonded together to function as a unit assembly 450a.

The manner in which the parts cooperate will be clearly understood with reference to Fig. 12. The conductors 423 and 424 embedded in insulation in the lower section of drill pipe project upwardly to different levels to receive the bridging conductors 425 and 426. The bridging conductor 426 is in elastic sliding engagement with the inner surface of conductor 424 and the bridging conductor 425 is in like engagement with the inner surface of conductor 423. In like manner, engagement exists between bridging conductor 425 and conductor 423a and between bridging conductor 426 and conductor 424a.

In Fig. 12, the transmission line conductors 421a—423a and 422a—424a in the upper section, with associated insulation and tubular protective member 438, are rigidly or resiliently bonded throughout the entire sectional length of drill pipe 432 to form a unit assembly of the installed transmission line. In like manner, the conductors 421—423 and 422—424 with associated insulation and tubular protective member 434 and the enclosing section of drill pipe 430—431 form another unit assembly of transmission line.

When it is desired to uncouple adjacent sections of the transmission line, with their respective sections of drill string 430, 431, and 432 shown in Fig. 12, the threaded connection of the drill string is unscrewed. As the upper section of drill pipe with its installed transmission line moves upwardly, frictional forces between chevron seal 437 and tubular protective member 436, between conductor 423a and bridging conductor 425 and between conductor 424a and bridging conductor 426, may cause the bridging conductor assembly 450a to move upwardly with the upper section of drill pipe until the transmission line is separated at the lower end of the bridging conductor assembly. If the frictional forces between the bridging assembly and the upper extremity of the lower section of transmission line are greater than those between the bridging assembly and the lower extremity of the upper section of transmission line, the separation of the transmission line will also be accomplished but the bridging assembly will remain with the lower section of transmission line.

Referring to Fig. 11, in assembling the line the bridging assembly 450a again acts as a unitary assembly. Accordingly, the assembly 450a may be placed on a terminal end of either section of the transmission line. As a slotted end of conductor 425 engages conductor 423 or 423a, a slotted end of conductor 426 engages conductor 424 or 424a. While the assembly is normally placed upon the lower conductors, such as conductors 423 and 424 of Fig. 11, the connector assembly may be first placed on either end of a section of transmission line with the other section then movable into circuit-completing position by screwing the drill-pipe sections together to complete the assembly with a substantial area of flow passage within the transmission line.

Figure 13:
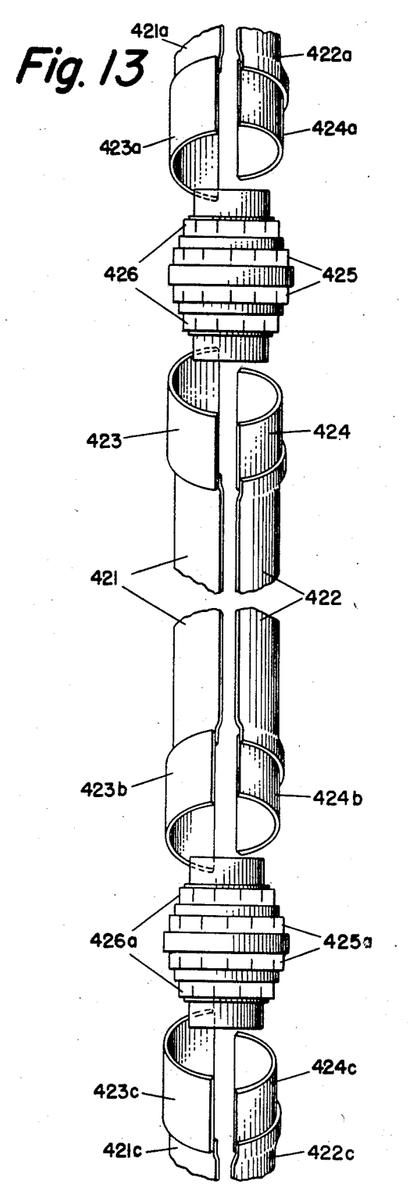
Fig. 13 is a perspective view of several sections of the line of Figs. 4–12.

It is apparent that a desired polarity can be pretermined and maintained throughout the electrical transmission system of Figs. 4–12 if the conductors in each section of the drill string are constructed as illustrated schematically in Fig. 13, because one side of the electrical circuit is always made by way of the outer conductor of each bridging conductor assembly and the other side of the electrical circuit is always made by way of the inner conductor of each bridging conductor assembly. More specifically, one side of the electrical circuit is accomplished by consecutive connections of conductors 421a, 423a, 425, 423, 421, 423b, 425a, 423c and 421c, and the other side of the circuit is accomplished by consecutive connections of conductors, 422a, 424a, 426, 424, 422, 424b, 426a, 424c, and 422c. Although the polarity feature is not necessary in the transmission of single phase A. C. power, it is a very convenient feature where D. C. power is to be transmitted, since it obviates the use of trial and error in connecting D. C. power to apparatus having a predetermined polarity.

Figure 14:
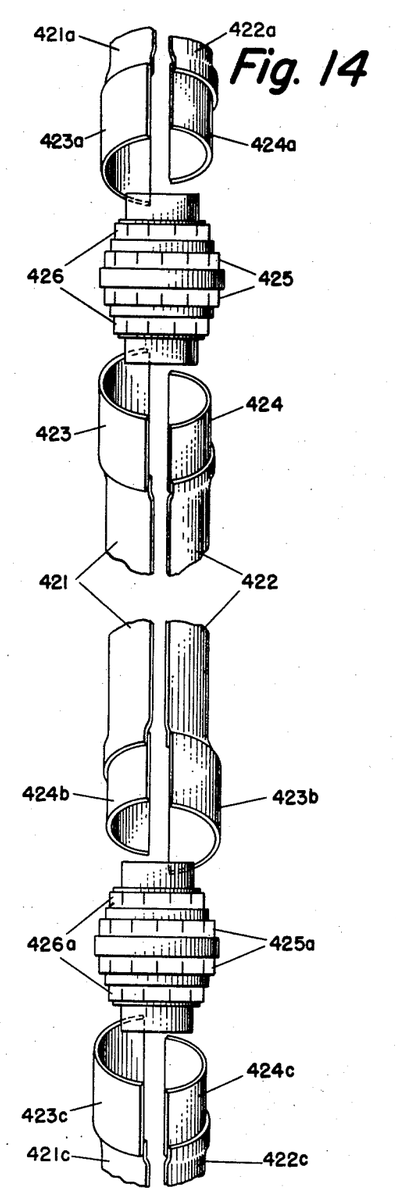
Fig. 14 is a perspective view of a modified transmission line providing transposed connections.

Fig. 14 is identical with Fig. 13 except that, instead of the longer semi-annular conductor 423b being soldered to conductor 421, it is in Fig. 14 silver-soldered to conductor 422. Similarly, instead of the shorter conductor 424b being attached to conductor 422, it is in Fig. 14 attached to conductor 421.

One side of the electrical circuit in Fig. 14 is completed by consecutive connections of conductors 421a, 423a, 425, 423, 421, 424b, 426a, 424c, and 422c and the other side of the circuit is completed by consecutive connections of conductors 422a, 424a, 426, 424, 422, 423b, 425a, 423c, and 421c. The polarity of bridging conductor 425 is shown to be opposite that of 425a and a similar difference in polarity exists between bridging conductors 426 and 426a.

Thus, electrical transpositions are accomplished in adjacent bridging conductor assemblies and, accordingly, the capacitances of the two sides of the circuit may be balanced with respect to ground.

The protecting sheaths or liners 434, 436, and 438, Fig. 12, define a large open passage. During the usual drilling operation, this passage provides a path for the flow of mud fluid down the drill string, and during other operations this passage provides space for the insertion of tools used in surveying, testing, and fishing operations. The inner diameter of the protecting sleeve 436 is limited, of course, by the fact that the two concentric annular bridging conductors 425 and 426 and the three concentric annular layers of insulation are present between sleeve 436 and the drill pipe. Since each conducting section of a length of drill pipe can be made to comprise only one annular layer in which each of the substantially semi-annular conductors 421 and 422, 421a and 422a is located, and only two annular layers of insulation, the diameters of the protecting liners 434 and 438 may be somewhat larger than the diameter of the protecting liner 436. The end portion of the protecting liner 438 in the upper conducting section and the end portion of the protecting liner 434 in the lower conducting section have diameters equal to that of the protecting liner 436 of the bridging assembly. These three diameters are made equal to provide a smooth wall in the inner passage and to permit uniform pressure sealing at each sealing or junction point.

Although the chevron-type seals 435 and 437, as shown in Fig. 12 are preferred, other sealing means could be substituted. O ring seals, compression seals, or other suitable seals could be used in place of the chevron-type seals. It is necessary to provide suitable sealing means at every junction between conducting section and annular connector, in order to prevent the leakage of mud fluid or other foreign matter into the conducting and insulating members. Such leakage would, of course, damage the electrical power transmission system.

Since all of the contacts between the conducting sections and the annular connectors are overlapping contacts rather than abutting contacts, close tolerances are not required in the longitudinal dimensions of the annular connectors. The axial dimensions of the annular connectors are preferably chosen so as to provide small annular spaces in each junction. Thus, fairly large tolerances are permissible, and provision for tool-joint wear is made. The regions on the annular connectors near these variable spaces should preferably be covered with an insulating grease before insertion of the annular bridging conductor assembly into the drill pipe. The electrical transmission system can be checked progressively by connecting a continuity tester, or other suitable test equipment, to the section of drill pipe just added to the drill string through a plug-in unit similar to the annular bridging conductor assembly. Continuity tests may then be made during the drill-string lowering operation.

In disassembling the drill string, each annular bridging conductor assembly should be removed from its section of drill pipe to eliminate any pockets in which mud or other foreign matter might collect. It is apparent from Figs. 6 and 12 that, if the upper section of drill pipe were disconnected from the lower section of drill pipe and the annular bridging conductor assembly were left connected to the lower conducting section, an annular pocket would be present between the upper portion of the annular bridging-conductor assembly and the box end of the drill-pipe section. Foreign matter could collect in this pocket and cause damage to the electrical parts. This is one reason why the annular bridging assembly 450a is preferably made as a separate removable unit, as shown in Fig. 11, rather than as the terminal portion at one end of a conducting section. It would not be desirable to construct the annular bridging sleeve connector 450a as an integral terminal portion of the upper conducting section, because if this were done the electrical terminals would protrude beyond the pin end of the upper drill-pipe section, and when this drill-pipe section was disconnected from the lower drill-pipe section 431, the protruding parts would be subject to damage during normal handling. With the annular bridging conductor assembly 450a constructed as a unit assembly and removable from the line, all exposed surfaces of the line terminals may be of solid construction and readily cleaned prior to successive make-up of the joint. The assembly 450a, including slotted contacts and being a separate unit, is easily cleaned to insure good electrical connections free from contaminating matter.

From the foregoing disclosure, it is apparent that there has been provided an electrical transmission system that is particularly useful for the transmission of electricity through a central passage in a drill string or other equipment having similar physical requirements, and that this electrical transmission system has an annular shape and occupies a minimum of space. An inner passage or mud column is provided having the maximum possible diameter and having a circular cross section, thus providing minimum friction to the flow of mud fluid and providing an unobstructed passage for tools or instruments. Maximum current-carrying capacity in the conductors is provided consistent with space limitations. Protecting liners prevent abrasion of the electrical transmission system from mud or other material traversing the inner passage, and sealing means at all junctions prevent the entry of foreign matter into the electrical lines or the bridging sleeves. The annular bridging sleeve of this invention is quickly and easily installed, and does not require threading. Since it is symmetrical, it may be inserted into the end of a drill-pipe section in either direction. The usual stabbing and threading of successive drill-pipe sections serves to locate the bridging sleeve properly between successive conducting sections. Electrical continuity is assured regardless of the relative angular positions of successive sections of drill pipe having a common axis. In a direct-current system, predetermined polarity relationships can be maintained throughout the electrical power transmission system, while in an alternating current system capacitance to ground may be balanced at alternate bridging conductor assemblies.

Figure 15:
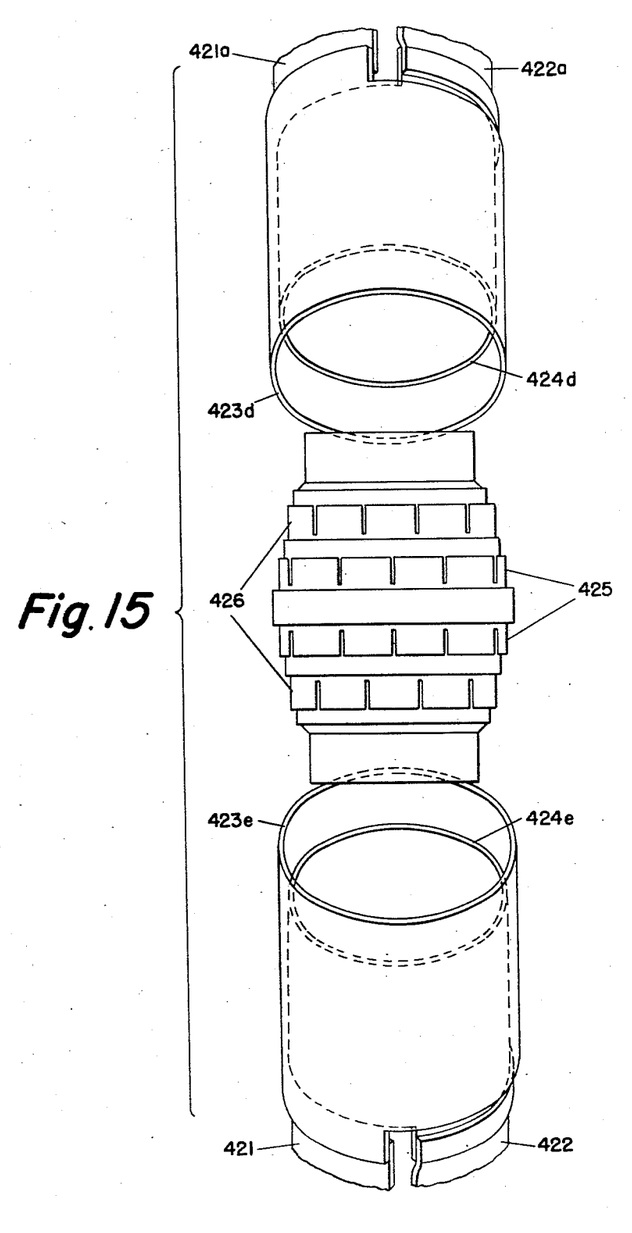
Fig. 15 is a perspective view of modified conductors for engagement with the bridging assembly.
Figures 16, 17:
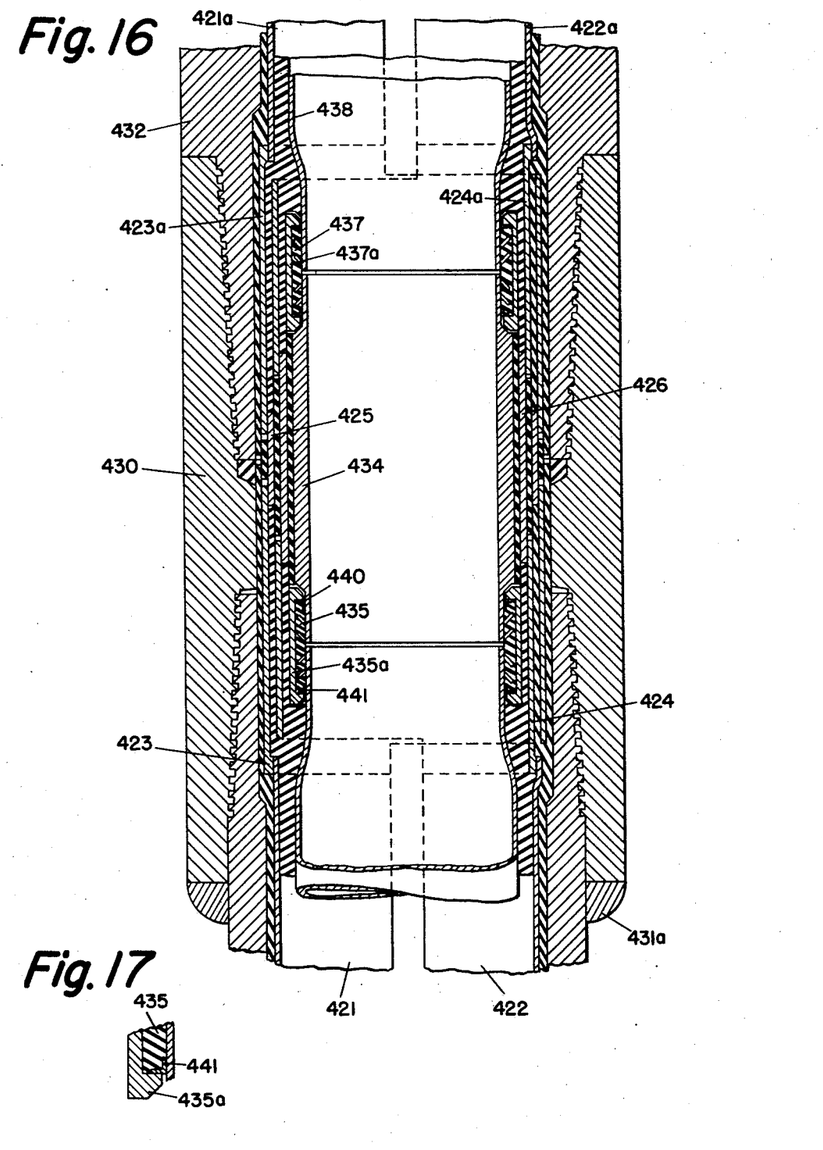
Fig. 16 is a sectional view, with insulation shown, of the line of Fig. 15.
Fig. 17 is an enlarged fractional view of Fig. 16.

A further modification of the transmission line is shown in the perspective view of Fig. 15 and the sectional view of Fig. 16. It will be recalled that in the semi-annular line of Fig. 11, the semi-annular terminal conductors 423 and 424 (and 424a and 423a) have different radii. Accordingly, as shown in Fig. 15, semi-annular conductors 421, 421a, 422, and 422a may have annular or cylindrical end portions 423d, 423c, and 424d and 424c. Thus, a greater contact area is provided between bridging conductors 425 and 426 and terminal conductors 423d, 423c, and 424d, 424c. Also of importance is the fact that the transmission line is stronger at its end portions where it is likely to receive greater abuse in handling.

In Fig. 16, additional features appear. The inner lining or sheath 434 is made thicker throughout its length except in the region of the chevron seals 435 and 437. The seals themselves are provided with metallic backing members 435a and 437a to provide additional strength and to provide annular pockets in which said seals 435 and 437 may nest. Annular corner reinforcing members 440 and 441, which are also provided, may consist of a fine-mesh screen embedded into the chevron seal, as best shown in Fig. 17.

A still further modification of the annular transmission line is the lengthening of the cylindrical terminals shown in Figs. 15 and 16 to extend throughout the drill-pipe section forming a tubular coaxial transmission line. A line of this construction would of necessity occupy a greater space, but would provide improved electrical characteristics and possible simplified manufacture. Such a transmission line is useful where the increased passage restriction can be tolerated.

The central-conductor and annular-conductor types of transmission line, although differing in electrical characteristics by virtue of their differences in conductor and insulation configuration, have been shown by measurement and computation, using well-known transmission-line theory, to be suitable not only for the transmission of bulk power, such as required for vibratory drilling, but also for the operation of other electrical devices.

Several modifications have been described and various alternative component parts together with some equivalents have been explained. It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts, may be substituted without departing from the spirit or scope of the invention herein disclosed.

What is claimed is:

1. An electrical transmission system having a plurality of conducting sections, each said conducting section comprising two substantially semi-annular electrical conductors spaced one from the other with their concave surfaces in opposed relationship and defining a generally cylindrical space between them, an outer annular layer of insulation around said conductors, an inner annular layer of insulation in the cylindrical space defined by said conductors, and in contact with said conductors, and insulation in the circumferential spaces between said conductors, and an annular bridging sleeve between each pair of successive conducting sections, said annular bridging sleeve comprising two concentric annular electrical bridging conductors, an intermediate annular layer of insulation between said concentric bridging conductors, an outer annular layer of insulation around the outer bridging conductor, and an inner annular layer of insulation inside the inner bridging conductor.

2. The electrical transmission system of claim 1, in which one said substantially semi-annular electrical conductor in each said conducting section has at each end a radially projecting terminal so constructed and positioned as to contact one said bridging conductor.

3. The electrical transmission system of claim 1, in which one said substantially semi-annular electrical conductor in each said conducting section extends beyond the other substantially semi-annular electrical conductor at each end and is so constructed and positioned as to contact said outer bridging conductor.

4. The electrical transmission system of claim 1, in which one said substantially semi-annular electrical conductor in each said conducting section extends beyond the other substantially semi-annular conductor at each end and is so constructed and positioned as to contact said outer bridging conductor, and in which said other substantially semi-annular conductor is provided at each end with a substantially semi-annular terminal portion having a radius smaller than that of the extending portion of said first-mentioned conductor and so constructed and positioned as to contact said inner bridging conductor.

5. The electrical transmission system of claim 2, in which said radially projecting terminal is continuous and annular in shape.

6. The electrical transmission system of claim 1, in which one said substantially semi-annular electrical conductor in each said conducting section is provided with an annular terminal portion extending beyond the terminal portion of the other substantially semi-annular conductor at each end, said extending terminal portion being so constructed and positioned as to contact said outer bridging conductor, and in which said other substantially semi-annular conductor is provided at each end with an annular terminal portion having a radius smaller than that of the extending terminal portion of said first-mentioned conductor and so constructed and positioned as to contact said inner bridging conductor.

7. The electrical transmission system of claim 1, in which each said substantially semi-annular electrical conductor in each said conducting section has at one end a radially projecting terminal so constructed and positioned as to contact one said bridging conductor, said radially projecting terminal on each said conductor being at the opposite end from the radially projecting terminal on the other said conductor.

8. The electrical transmission system of claim 1, in which each said substantially semi-annular electrical conductor in each said conducting section includes at one end a substantially semi-annular terminal portion extending beyond the terminal of the other said substantially semi-annular electrical conductor, said extending terminal portion being so constructed and positioned as to contact said outer bridging conductor.

9. The electrical transmission system of claim 1, in which each said substantially semi-annular electrical conductor in each said conducting section includes at one end a substantially semi-annular terminal portion extending beyond the terminal of the other said substantially semi-annular electrical conductor, said extending terminal portion being so constructed and positioned as to contact said outer bridging conductor, and in which each said substantially semi-annular electrical conductor includes at its opposite end a substantially semi-annular terminal portion having a radius smaller than that of the extending portion of said first-mentioned conductor and so constructed and positioned as to contact said inner bridging conductor.

10. The electrical transmission system of claim 1, in which each said substantially semi-annular electrical conductor in each said conducting section is provided at one end with an annular terminal portion extending beyond the terminal portion of the other said substantially semi-annular electrical conductor, said extending terminal portion being so constructed and positioned as to contact said outer bridging conductor, and in which each said substantially semi-annular electrical conductor is provided at its opposite end with an annular terminal portion having a radius smaller than that of each said extending terminal portion and so constructed and positioned as to contact said inner bridging conductor.

11. An electrical transmission system according to claim 1, in which a protective sheath is provided for the conducting sections there being at each end of each conducting section an annular-shaped chevron-type seal between said semi-annular electrical conductors and said protective sheath.

12. The combination set forth in claim 11, in which an annular metallic backing member and a corner reenforcing member are provided for each chevron seal.

13. The electrical transmission system of claim 11, in which said substantially semi-annular electrical conductors in each said conducting section extend beyond said protective sheath at each end, and in which a portion of said chevron-type seal extends beyond the end of said protective sheath.

14. An electrical transmission system according to claim 13, in which said annular layer of insulation in said annular bridging sleeve extends beyond said inner bridging conductor at each end, said inner bridging conductor extends beyond said intermediate annular layer of insulation at each end, said intermediate annular layer of insulation extends beyond said outer bridging conductor at each end, and said outer bridging conductor extends beyond said outer annular layer of insulation at each end, and in which said annular bridging sleeve includes an annular protecting sleeve inside said inner annular layer of insulation, said protecting sleeve extending beyond said inner annular layer of insulation at each end.

15. The electrical transmission system of claim 14, in which a substantial portion of each said extending portion of said chevron-type seal at each end of each said conducting section is confined between said substantially semi-annular electrical conductors and the portion of said annular protecting sleeve extending beyond said inner annular layer of insulation at each end of each said annular bridging sleeve.

16. An electrical transmission system comprising a pair of substantially semi-annular conductors having a common axis and longitudinally axially spaced one from the other, an annular bridging conductor disposed coaxially with respect to said semi-annular conductors, the radius of said annular conductor differing from the radius of said semi-annular conductors, each of said semi-annular conductors in the region of said annular conductor having extensions engageable by said annular conductor to form an electrical connection therebetween with one of said semi-annular conductors in any angular position relative to the other of said semi-annular conductors.

17. In an electrical transmission line, electrical conductors and structure for electrically connecting them comprising an annular bridging conductor for each of said electrical conductors, each bridging conductor being of differing diameter and coaxial one with another, each of said electrical conductors having an end portion disposed in line with one of said bridging conductors for wiping electrical engagement therewith, and insulating means rigidly supporting said electrical conductors and said bridging conductors to maintain their relative spacing during relative lengthwise movement for said wiping engagement, at least one of the conductors in the region of said wiping engagement being resilient for development of contact pressure therebetween.

18. The combination set forth in claim 17, in which one of said bridging conductors has a changing cross section lengthwise thereof providing interlocking engagement with insulation interposed between it and the other of said bridging conductors for movement of both of them as a unit.

19. The combination set forth in claim 17, in which said bridging conductors and the electrical insulation associated therewith are protected by a sheath, the conductors of said transmission line together with their insulation also being protected by sheaths in the respective adjoining sections of the line, and sealing means at the meeting ends of said sheaths, each said sealing means having an interlocking connection with its associated sheath forming a part of a section of the transmission line for retention of said sealing means in position upon separation of said bridging conductors from the conductors of said line.

20. The combination set forth in claim 17, in which said insulating means supporting said bridging conductors includes members extending beyond the ends of the respective bridging conductors and having diameters such as to permit overlapping telescopic movement in assembly and thereby to provide increased electrical leakage paths between conductors.

21. The combination set forth in claim 17 in which each said electrical conductor is disposed for pressure-encircling relationship with one of said annular bridging conductors.

22. The combination set forth in claim 17, in which two of said electrical conductors are substantially semi-annular in shape, one end portion being disposed in pressure-encircling relationship with one of said bridging conductors and another electrical conductor being in pressure-encircling relationship with another of said bridging conductors whereby electrical contact is made between them regardless of the relative angular position between said electrical conductors and said bridging conductors, and other electrical conductors having end portions for electrical engagement with opposite end portions of said bridging conductors.

23. The combination set forth in claim 17, in which each said electrical conductor is substantially semi-annular in shape and in which each end portion of each said substantially semi-annular conductor is continuous and annular in shape.

24. An electrical transmission system having a plurality of conducting sections, each said conducting section comprising a plurality of conductors arcuate in cross section angularly spaced around a common axis and insulated one from another, each said conductor having at each end a terminal portion disposed at a radial distance different from that of the terminal portion of every other said conductor at the same end, and an annular bridging sleeve between each pair of successive conducting sections, said annular bridging sleeve comprising a plurality of concentric annular electrical bridging conductors insulated one from another, each said bridging conductor having a different diameter such as to provide wiping contact between each said bridging conductor and the terminal portion of each said arcuate conductor respectively in each adjacent conducting section in which the arcuate conductors of one said conducting section may be in any angular position relative to the arcuate conductors of an adjacent conducting section.

25. An electrical transmission system having a plurality of conducting sections, each said conducting section comprising coaxial electrical conductors insulated one from another, a bridging sleeve between each pair of successive conducting sections, said bridging sleeve comprising concentric annular electrical bridging conductors insulated one from another and having diameters at each end such as to provide wiping contact each with one of said coaxial electrical conductors in each adjacent conducting section, a cylindrical sheath protecting each said conducting section and insulated from the conductors thereof, a cylindrical sheath protecting each said bridging sleeve and insulated from the bridging conductors thereof, and sealing means at each junction of protective sheaths.

26. An electrical transmission system having a plurality of conducting sections, each said conducting section comprising an inner cylindrical electrical conductor and an outer annular electrical conductor coaxially disposed and insulated one from the other, a bridging sleeve between each pair of successive conducting sections, said bridging sleeve comprising a pair of concentric annular electrical bridging conductors insulated one from the other and having diameters at each end such as to provide encircling wiping contact each with one of said coaxial electrical conductors in each adjacent conducting section, a cylindrical protective sheath around each said conducting section and insulated from the conductors therein, a cylindrical protective sheath around each said bridging sleeve and insulated from the bridging conductors therein, and pressure-expansible type sealing members at each junction of protective sheaths.

27. In a drill string, a transmission line according to claim 26, including a plurality of spacer fins connected to said sheath and extending radially outward from said sheath in such manner as to maintain said transmission line centrally located within a cylindrical mud passage in said drill string, and brackets secured to the wall of said mud passage, each said bracket including a vertical slot open at its upper end and extending downward through a portion of said bracket, to support said fins and to permit sliding removal in an upward direction in said drill string such that said transmission line may be removed in lengths each comprising at least one section of said line, with said drill string remaining intact.

References Cited in the file of this patent
UNITED STATES PATENTS

| | | |
|---|---|---|
| 1,508,023 | Moomy | Sept. 9, 1924 |
| 1,541,756 | Williams | June 9, 1925 |
| 1,817,774 | Sipe | Aug. 4, 1931 |
| 2,096,279 | Karcher | Oct. 19, 1937 |
| 2,178,931 | Crites et al. | Nov. 7, 1939 |
| 2,239,026 | Wagner | Apr. 22, 1941 |
| 2,255,657 | Freedman | Sept. 9, 1941 |
| 2,470,631 | McClennan | May 17, 1949 |
| 2,486,285 | Hurst | Oct. 25, 1949 |
| 2,504,777 | Wreford | Apr. 18, 1950 |